United States Patent [19]
Smith et al.

[11] 3,939,796
[45] Feb. 24, 1976

[54] APPARATUS FOR VISUALLY INDICATING WHEN A POOL FILTER IS DIRTY

[75] Inventors: Clarence G. Smith, Pomona; Richard O. Lightfoot, Pacific Palisades, both of Calif.

[73] Assignee: Muskin Corporation, Colton, Calif.

[22] Filed: Sept. 27, 1974

[21] Appl. No.: 510,004

[52] U.S. Cl. ............. 116/114 PV; 137/557; 210/90
[51] Int. Cl.² ........................................ B01D 35/14
[58] Field of Search ........... 116/114 AD, 117 C, 70, 116/DIG. 42, 114 PV; 73/38, 406, 408, 420; 210/90; 137/557; 64/DIG. 2; 74/470

[56] References Cited
UNITED STATES PATENTS

| | | | |
|---|---|---|---|
| 1,227,080 | 5/1917 | Schinkez | 116/70 |
| 2,902,861 | 9/1959 | Frost et al. | 73/408 |
| 3,221,704 | 12/1965 | Johannsen | 137/557 |
| 3,402,690 | 9/1968 | Willis | 116/70 |
| 3,532,069 | 10/1970 | Morgan et al. | 116/70 |

Primary Examiner—Richard C. Queisser
Assistant Examiner—Marcus S. Rasco
Attorney, Agent, or Firm—Christie, Parker & Hale

[57] ABSTRACT

Apparatus for indicating when a swimming pool filter needs to be cleaned, which comprises a flexible diaphragm covering an opening in the conduit on the inlet side of a pool filter and a housing covering the diaphragm with a movable piston member inside the housing and engaging the surface of the diaphragm. Spring means urges the piston against the diaphragm to counteract pressure of water in the conduit against the diaphragm. A movable flag is operated by the piston means to indicate through a window in the housing when the piston has moved a predetermined distance.

2 Claims, 3 Drawing Figures

U.S. Patent  Feb. 24, 1976  3,939,796
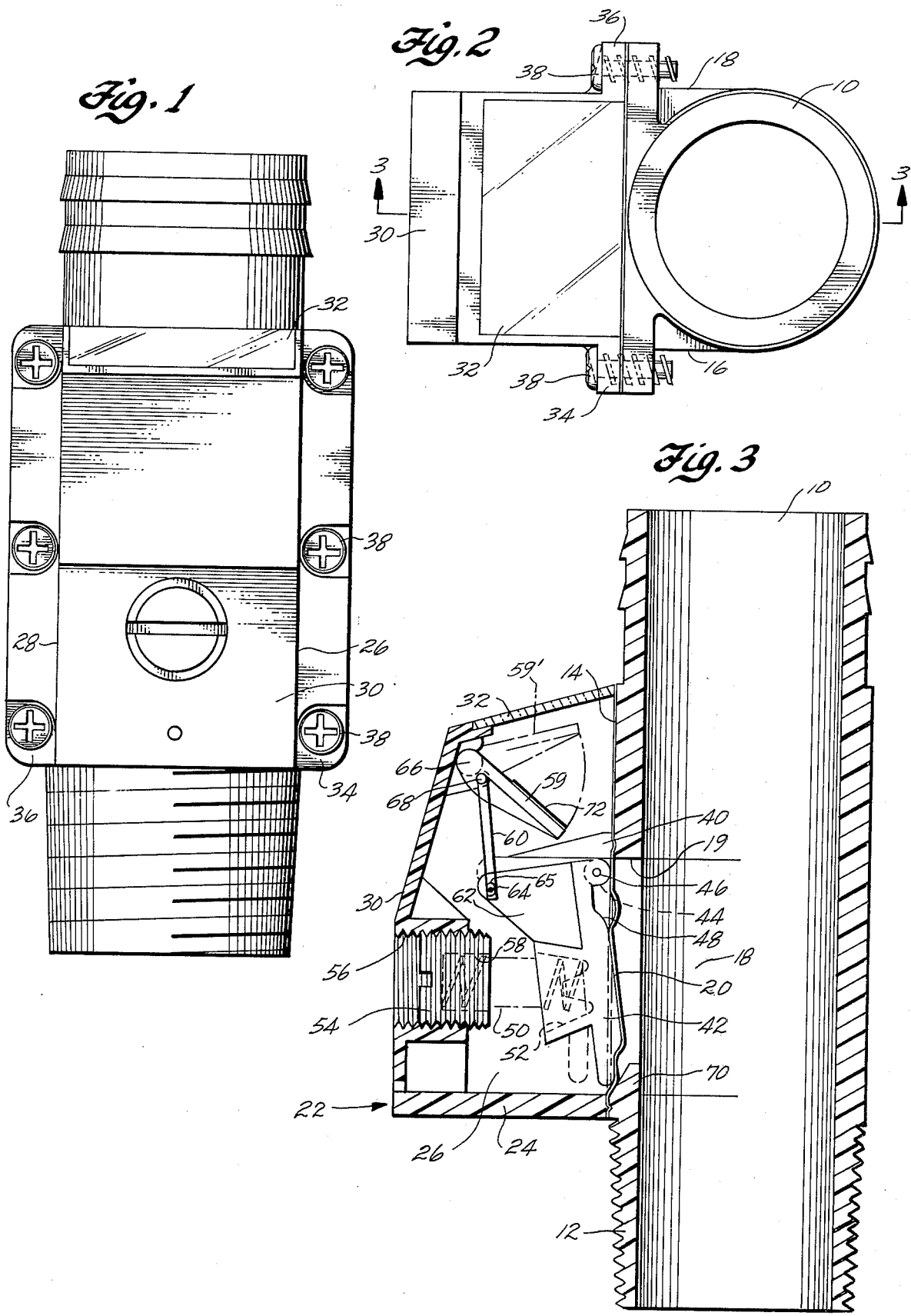

APPARATUS FOR VISUALLY INDICATING WHEN A POOL FILTER IS DIRTY

FIELD OF THE INVENTION

This invention relates generally to fluid pressure indicators, and more particularly, is concerned with an indicator responsive to inlet pressure to a swimming pool filter to indicate when the filter is dirty.

BACKGROUND OF THE INVENTION

It is well known to use pressure gauges on the inlet side of swimming pool filters to indicate the inlet water pressure. As the filter accumulates dirt and foreign matter from the water being filtered, its porosity is reduced, the flow rate is reduced, and inlet pressure increases. However, conventional pressure gauges are relatively expensive to manufacture and install and are sometimes difficult to read. Furthermore they require the user to know at what pressure level it is desirable or necessary to clean the filter.

SUMMARY OF THE INVENTION

The present invention is directed to a relatively inexpensive and easily read indicator for signaling when a pool filter has reached the stage where it should be cleaned or replaced. In brief, the indicator includes a conduit adapted to be connected into the inlet line to the filter. A hole in the conduit wall is covered by a flexible diaphragm within a housing. A piston in the housing is urged by a spring against the diaphragm to resist the opposing water pressure in the conduit. A lever connected to the piston moves a flag into viewing position in front of a window in the housing by a small movement of the piston against the spring.

BRIEF DESCRIPTION OF THE DRAWING

For a more complete understanding of the invention, reference should be made to the accompanying drawings, wherein:

FIG. 1 is a front elevational view of the invention;

FIG. 2 is a top view; and

FIG. 3 is a sectional view taken substantially on the line 3—3 of FIG. 2.

DETAILED DESCRIPTION

Referring to the drawings in detail, the numeral 10 indicates generally a conduit molded of plastic. One end of the conduit has an external pipe thread 12 for connecting into the outlet fitting of a conventional swimming pool pump or other source of water under pressure. The other end of the conduit 10 may be provided with any suitable arrangement for connecting to the inlet of a pool filter.

An integrally molded tangential wall section forms a flat outer surface 14 extending along one side of the conduit, and tangential sidewalls 16 and 18 extend perpendicularly to the flat surface 14. The conduit has an opening 19 through the surface 14, the opening being substantially rectangular in outline. A diaphragm 20 of flexible material, such as a sheet of neoprene rubber or the like, overlays the surface 14 and extends across the opening 19 in the wall to conduit 10. The diaphragm is held tightly in place against the surface 14 by a housing indicated generally at 22. The housing includes a bottom wall 24 which extends along the lower margin of the opening 19, clamping the lower end of the diaphragm 20 to the surface 14 adjacent the bottom edge of the hole 19. The housing includes vertical sidewalls 26 and 28 which extend on either side of the opening 19, and a front wall 30. A slanted top wall 32 is made of transparent plastic material to form a viewing window in the housing. The top wall 32 is sealed in place to the rest of the housing around the edges to prevent dirt and moisture from entering the interior of the housing.

The housing is secured to the surface 14 of the conduit 10 by means of flanges 34 and 36 at the edges of the sidewalls 26 and 28. Screws 38 extend through the flanges and threadably engage the conduit to secure the housing 22 in position. The diaphragm 20 is securely clamped between the surface 14 and the edges of the housing 22.

The housing 22 is formed with an integral ledge 40 which bridges the space between the inner surfaces of the sidewalls 26 and 28 immediately above the upper margin of the opening 19 in the conduit when the housing 22 is in assembled position. The ledge provides a hinged support for a piston member 42. Brackets 44 projecting downwardly from the ledge 40 receive a hinge pin 46 which passes through the piston member 42 adjacent the upper corner thereof. The piston member has a surface 48 which engages the diaphragm 20 opposite the opening 19.

The piston member 42 is urged inwardly toward the opening 19 by a compression coil spring 50, one end of which is seated in a cup-shaped recess 52 in the back side of the piston member 42. The other end of the spring 50 is seated in a recessed screw 54 positioned in a threaded opening 56 through the lower front wall 30 of the housing 22. The screw has a recess 58 in which the compression spring 50 is seated. Threading of the screw in or out adjusts the amount of compression under which the spring 50 is restrained.

As the fluid pressure inside the conduit 10 increases, it forces the diaphragm against the piston 42, and the piston 42 in turn compresses the spring 50. Movement of the piston 42 activates an indicator or flag 59 through a linkage 60 pivotally connected to the piston 42. The piston 42 has an integral lever arm 62 projecting from the back of the piston to which the linkage 60 is pivotally connected by a pivot pin 64. The pin 64 passes through an elongated or oval opening 65 in the arm 62 to provide lost motion in the linkage. The flag element 59 is hinged at one end to the housing 22 for rotation about a pivot axis 66. The linkage 60 is connected to the flag member 59 through a pivot pin 68. By making the distance between the pivot axis 66 of the flag element and the pivot pin 68 of the linkage 60 very small compared to the distance between the pivot pin 64 and the hinge pin 46, very small movement of the piston 42 inwardly against the spring 50 rotates the flag member 59 up into the dotted position 59' where it is clearly visible through the top wall 32. The lever arm 62 of the piston 42 acts as a stop member which engages the ledge 40 when the piston 42 rotates through a predetermined distance.

In the absence of water pressure inside the conduit 10, the spring 50 pushes the piston 42 against a stop 70 projecting up into the opening 19 from the lower margin of the opening. The flag 59 may be provided with a decal 72 on the front surface thereof on which appears a suitable legend such as "Clean Me". The indicator is operated with a very small incremental increase in pressure by setting the spring to a preload compression which holds the piston 42 against the stop 70 until the upper limit of normal operating pressure is reached. A slight increase in pressure over the preset upper limit moves the piston 42 off the stop. When the lost motion of slot 65 is overcome, further movement of the piston causes the flag to go from the hidden to the visible position with a very small additional incremental pressure increase. Thus as the filter accumulates dirt and reaches the point where flow of water through the filter is greatly restricted, the indicator device flops over to give a clear indication that the filter needs to be cleaned or replaced.

What is claimed is:

1. Apparatus for indicating when a swimming pool filter needs to be cleaned, comprising a conduit member adapted to be connected to the inlet side of a pool filter for directing water into the filter, the conduit having an opening along the side, means projecting around the opening forming a flat surface, a diaphragm of flexible material in contact with said surface and extending across the opening, housing means covering the diaphragm and clamping the diaphragm against said surface, a piston member movably supported in the housing means, the piston member having a surface engaging the diaphragm, spring means urging the piston surface and diaphragm toward the conduit against the pressure exerted against the diaphragm by water in the conduit, the housing means having a window therein, a pivoted flag positioned adjacent the window, and linkage means connecting the piston means to the flag for moving the flag in response to movement of the piston means, the flag being movable between a position viewable through the window and a position out of view through the window, the linkage means moving the flag into the viewable position when the piston means moves against the urging of the spring a predetermined distance, the piston means including a hinged member extending across said opening with one side in contact with the diaphragm, the linkage means being pivotally connected at one end to the flag means and at the other end to the hinged member, the linkage means including lost motion means for allowing the hinged member to move a predetermined distance before it begins to move the flag through the linkage means.

2. Apparatus of claim 1 further including means for adjusting the force of the spring means against the piston member.

* * * * *